US012711123B2

(12) United States Patent
Colle et al.

(10) Patent No.: US 12,711,123 B2
(45) Date of Patent: Aug. 18, 2026

(54) ENABLING REAL-TIME SYNCHRONIZATION OF DATA BETWEEN WEB CLIENTS WITH A COMBINATION OF PROTOCOLS

(71) Applicant: SAP SE, Walldorf (DE)

(72) Inventors: Renzo Colle, Stutensee (DE); Vincent Escalier, Chatou (FR); Martin Mueller, Walldorf (DE); Marcel Waechter, Graben-Neudorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/889,710

(22) Filed: Sep. 19, 2024

(65) Prior Publication Data

US 2026/0079909 A1 Mar. 19, 2026

(51) Int. Cl.
*G06F 16/23* (2019.01)
*G06F 21/62* (2013.01)

(52) U.S. Cl.
CPC ...... *G06F 16/2358* (2019.01); *G06F 21/6218* (2013.01)

(58) Field of Classification Search
CPC ......................... G06F 16/2358; G06F 16/6218
See application file for complete search history.

(56) References Cited

U.S. PATENT DOCUMENTS 8,788,295 B1 * 7/2014 Wargin .................. G06Q 40/08 715/764
2008/0215489 A1 * 9/2008 Lawson .................... G07F 7/08 705/50
2018/0032399 A1 * 2/2018 Johnson ................ G06F 11/142
2023/0353575 A1 * 11/2023 Chandra ................. H04L 63/08
2024/0121012 A1 * 4/2024 Miller ..................... G10K 11/34
2024/0184771 A1 * 6/2024 Kruempelmann .. G06F 16/2282
2025/0111335 A1 * 4/2025 Wilson .................. G06F 3/0482

* cited by examiner

*Primary Examiner* — Tarek Chbouki
(74) *Attorney, Agent, or Firm* — Mintz Levin Cohn Ferris Glovsky and Popeo, P.C.

(57) ABSTRACT

Various embodiments are disclosed for implementing a collaborative draft which allows several users to edit the same object at the same time, in a collaborative manner. A first computing device may receive, via a first protocol, an indication of a modification made to a first database object on a second computing device. Next, the indication of the modification made to the first database object is displayed in a user interface on the first computing device of a first user. Content associated with the modification is retrieved from the second computing device by the first computing device via a second protocol responsive to determining that access rights of the first user permit the content to be displayed to the first user, where the second protocol is different from the first protocol. Then, the content associated with the modification to the first database object is displayed by the first computing device.

13 Claims, 12 Drawing Sheets

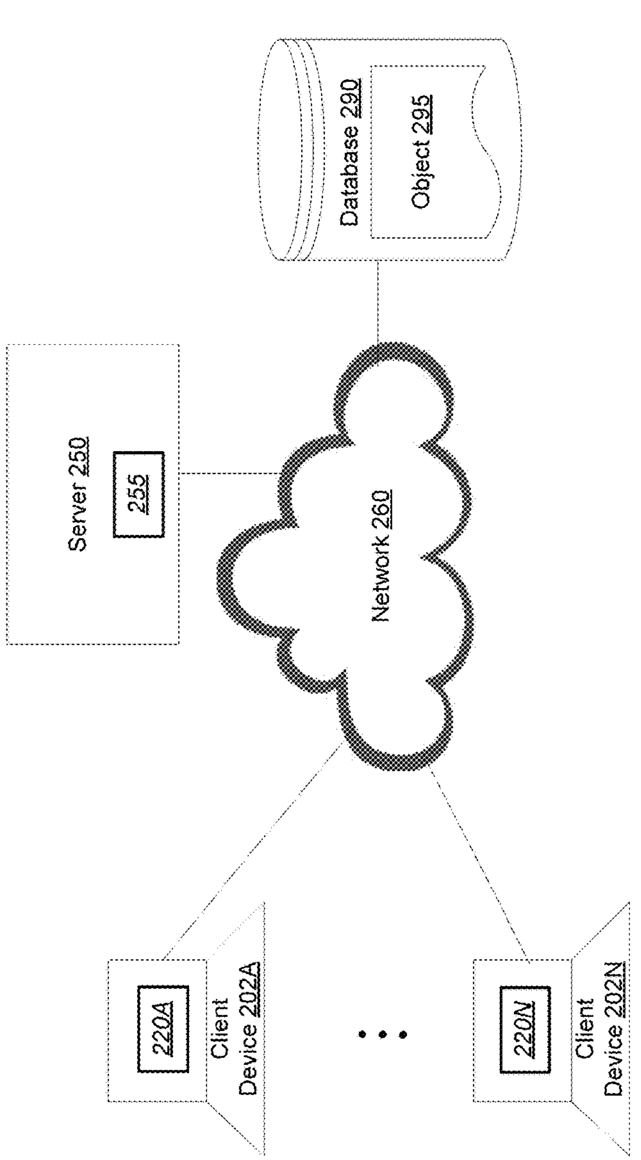
FIG. 2

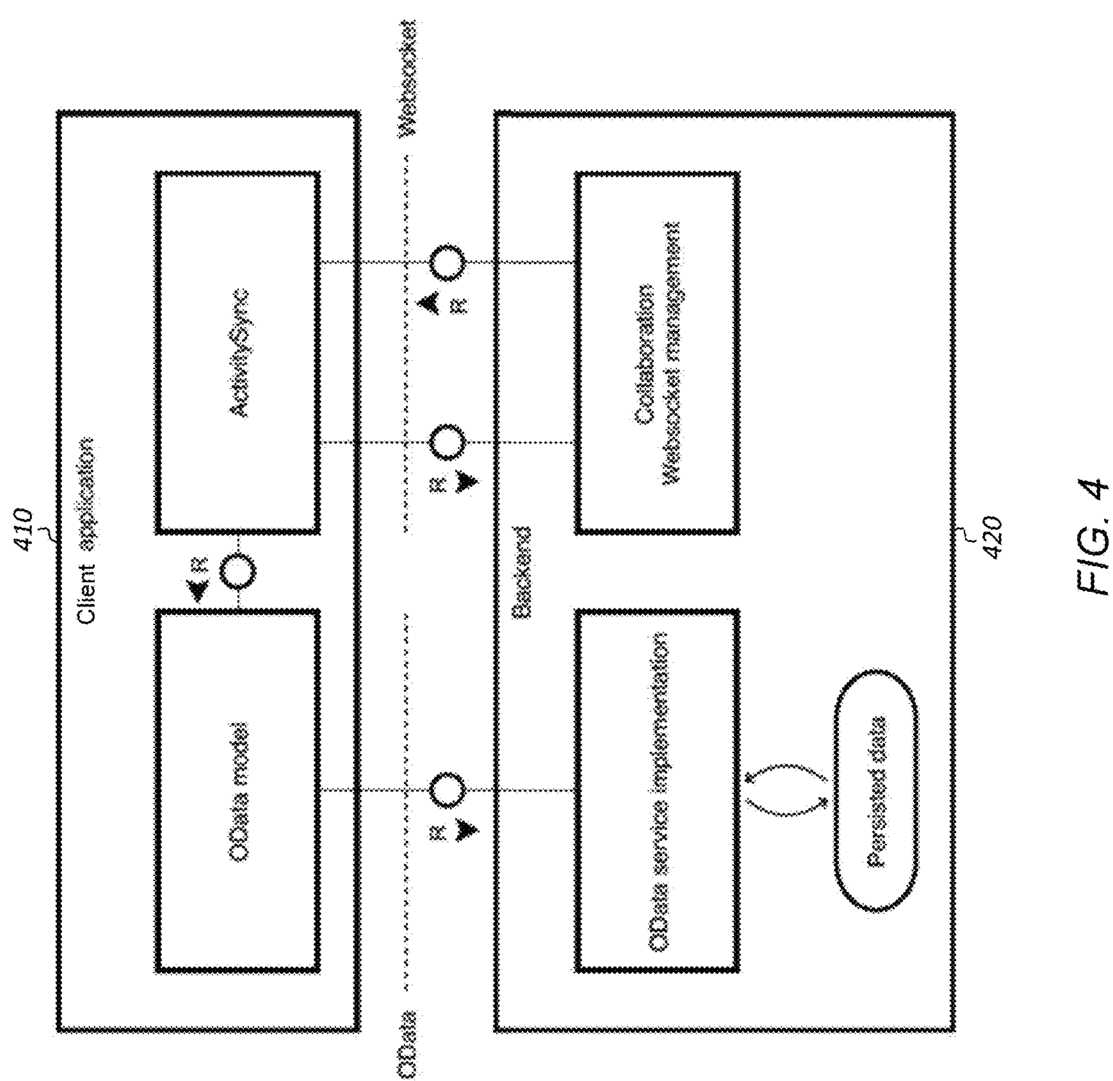
FIG. 4

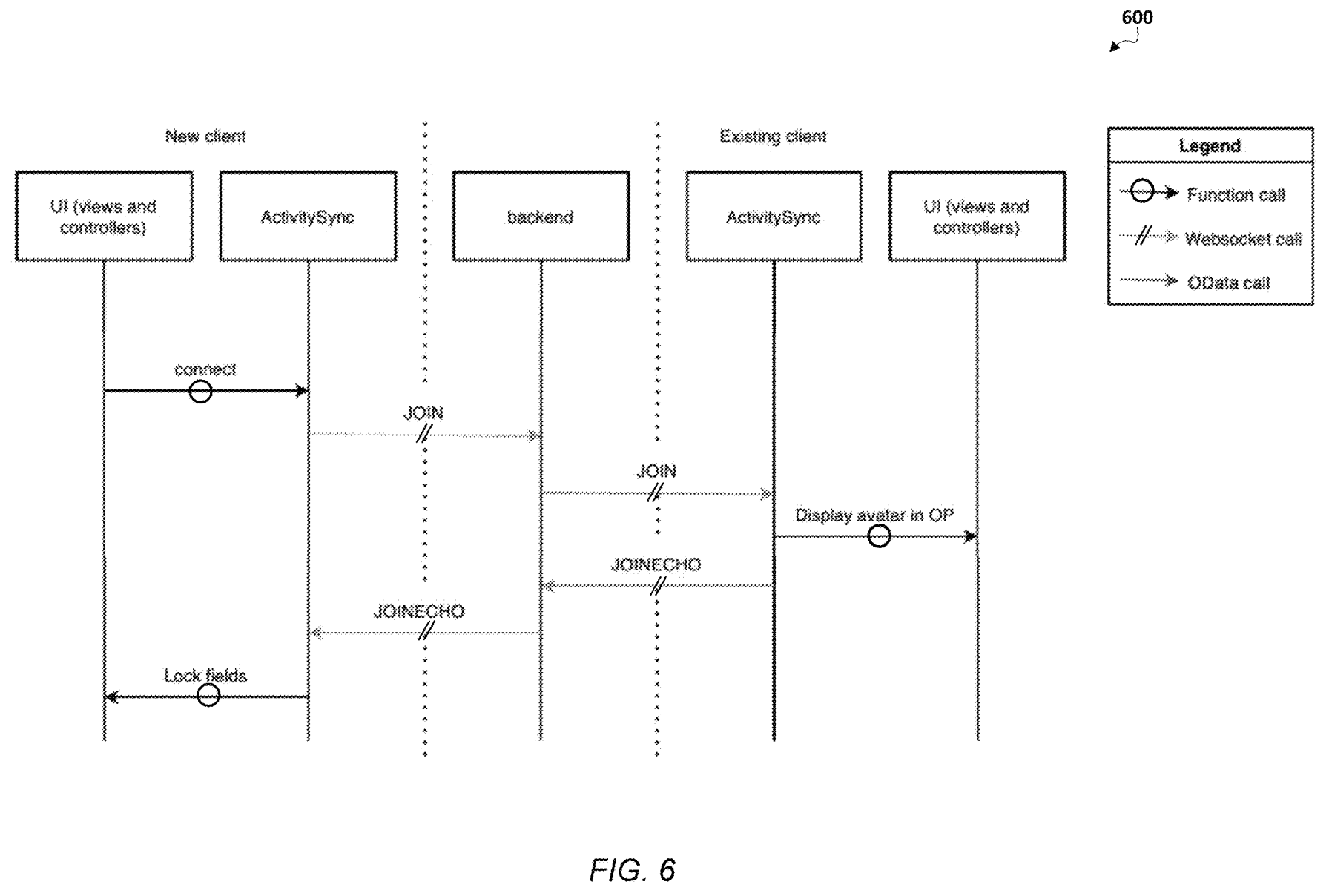

600

Legend
Function call
Websocket call
OData call

New client
UI (views and controllers)
ActivitySync
backend
Existing client
ActivitySync
UI (views and controllers)

connect
JOIN
JOIN
JOINECHO
Display avatar in OP
JOINECHO
Lock fields

FIG. 6

| Action Name | Description | Optional Parameters |
|---|---|---|
| ACTION | Sent when an Odata action is triggered | Name of the action and path to the objects the action is triggered on |
| ACTIVATE | Sent when the draft is saved | Path to the active instance |
| CHANGE | Sent when some properties have been modified | Paths to changed properties |
| CREATE | Sent when sub-objects are created within the draft | Path to the created objects |
| DELETE | Sent when sub-objects are deleted | Paths to the deleted objects |
| DISCARD | Sent when the draft is discarded | Path to the active instance (if any) |
| JOIN | Sent when entering the draft | |
| JOINECHO | Send back by other clients when a new client enters the draft | Paths to locked properties |
| LEAVE | Sent when leaving the draft | |
| LOCK | Sent when a field gets the focus | Path to the property |
| UNLOCK | Sent when a field loses the focus | Path to the property |

FIG. 9

ENABLING REAL-TIME SYNCHRONIZATION OF DATA BETWEEN WEB CLIENTS WITH A COMBINATION OF PROTOCOLS

TECHNICAL FIELD

The present disclosure generally relates to enabling several users to edit the same object at the same time, in a collaborative manner.

BACKGROUND

Various scenarios may be encountered when drafts are being edited by one or more users. Exclusive drafts refer to drafts that are editable by a single unique user. When a user modifies an exclusive draft, the draft is locked to prevent other users from modifying the draft at the same time. Once this user finishes the modifications, this user releases the lock, allowing the opportunity for the next user to obtain the lock so as to modify the draft. On the other hand, collaborative applications may enable dispersed teams to jointly modify documents of various types. However, various challenges may be encountered when attempting to implement collaborative applications.

SUMMARY

In some implementations, collaborative applications may enable dispersed teams to jointly modify documents of various types. Collaborative applications allow several users to edit the same object at the same time, in a collaborative manner. In one embodiment, a first computing device receives, via a first protocol, an indication of a modification made to a first database object on a second computing device. Next, the indication of the modification made to the first database object is displayed in a user interface on the first computing device of a first user. Content associated with the modification is retrieved from the second computing device by the first computing device via a second protocol responsive to determining that access rights of the first user permit the content to be displayed to the first user, where the second protocol is different from the first protocol. Then, the content associated with the modification made to the first database object is displayed in the user interface on the first computing device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates a block diagram of a computing system, in accordance with some example implementations of the current subject matter;

FIG. 4 illustrates a framework diagram showing connections between a backend and a client application, in accordance with some example implementations of the current subject matter;

FIG. 6 illustrates a sequence diagram of the events associated with a user joining a collaborative draft, in accordance with some example implementations of the current subject matter;

FIG. 9 illustrates a list of actions for messages broadcast to clients through a websocket, in accordance with some example implementations of the current subject matter;

DETAILED DESCRIPTION

Figure 1:
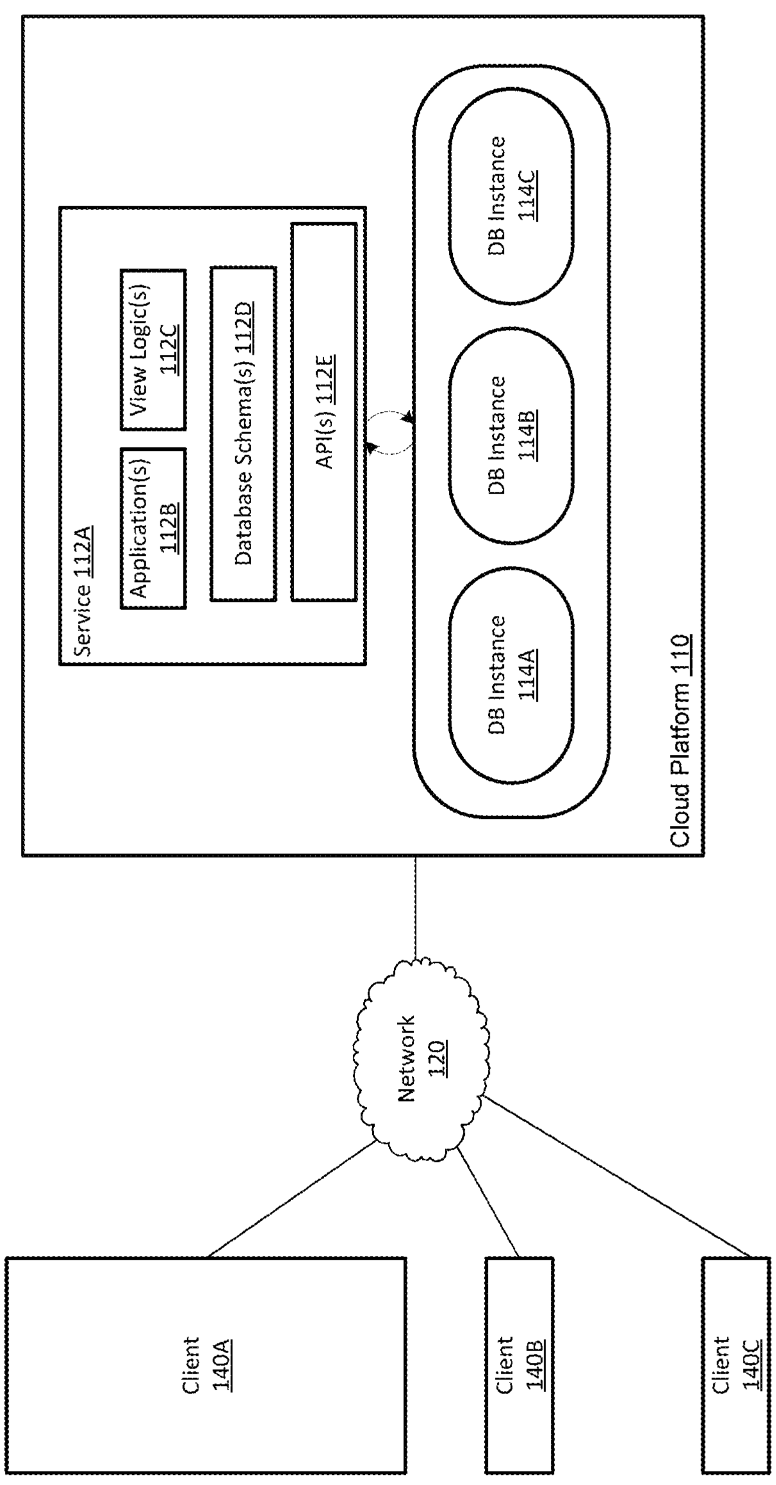
FIG. 1 illustrates a logical diagram of an example of a system, in accordance with some example implementations of the current subject matter.

FIG. 1 depicts a diagram illustrating an example of a system 100 consistent with some implementations of the current subject matter. Referring to FIG. 1, the system 100 may include a cloud platform 110. The cloud platform 110 may provide resources that can be shared among a plurality of tenants. For example, the cloud platform 110 may be configured to provide a variety of services including, for example, software-as-a-service (Saas), platform-as-a-service (PaaS), infrastructure as a service (IaaS), database as a service (DaaS), and/or the like, and these services can be accessed, via network 120, by one or more tenants of the cloud platform 110. Network 120 may be any wired and/or wireless network including, for example, a public land mobile network (PLMN), a wide area network (WAN), a local area network (LAN), a virtual local area network (VLAN), the Internet, and/or the like.

In the example of FIG. 1, the system 100 includes a first tenant 140A (labeled client), a second tenant 140B, and a third tenant 140C, although cloud platform 110 may have other quantities of tenants. The clients may each comprise a user device (e.g., a computer including an application such as a browser or other type of application). The user device may be a processor-based device including, for example, a smartphone, a tablet computer, a wearable apparatus, a virtual assistant, an Internet-of-Things (IoT) appliance, and/or the like. Each client may access, via network 120, at least one of the services at the cloud platform 110. In some implementations, each of the tenants 140A-C represents a separate tenant at the cloud platform 110, such that a tenant's data is not shared with other tenants (absent permission from a tenant). Alternatively, each of the tenants 140A-C may represent a single tenant at the cloud platform 110, such that the tenants do share a portion of the tenant's data, for example.

The cloud platform 110 may include resources, such as at least one computer (e.g., a server), data storage, and a network (including network equipment) that couples the computer(s) and storage. The cloud platform may also include other resources, such as operating systems, hypervisors, and/or other resources, to virtualize physical resources (e.g., via virtual machines), provide deployment (e.g., via containers) of applications (which provide services, for example, on the cloud platform, and other resources. In the case of a "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In the example of FIG. 1, the cloud platform 110 includes a service 112A, which is provided to the client 140A. This service 112A may be deployed via a container, which provides a package or bundle of software, libraries, configuration data to enable the cloud platform to deploy during runtime the service 112A to, for example, one or more virtual machines that provide the service at the cloud platform. In the example of FIG. 1, the service 112A is deployed during runtime, and provides at least one application such as an application 112B (which is the runtime application providing the service at 112A and served to the client 140A). To illustrate further, client 140A may access the application 112B to view data and/or query data stored in a database instance 114A, for example.

The service 112A may also provide view logic 112C. The view logic (also referred to as a view layer) links the application 112B to the data in the database instance 114A, such that a view of certain data in the database instances is generated for the application 112B. For example, the view logic may include, or access, a database schema 112D for database instance 114A in order to access at least a portion of at least one table at the database instance 114A (e.g., generate a view of a specific set of rows and/or columns of a database table or tables). In other words, the view logic 112C may include instructions (e.g., rules, definitions, code, script, and/or the like) that can define how to handle the access to the database instance and retrieve the desired data from the database instance.

The service 112A may include the database schema 112D. The database schema 112D may be a data structure that defines how data is stored in the database instance 114A. For example, the database schema may define the database objects that are stored in the database instance 114A. The view logic 112C may provide an abstraction layer between the database layer (which include the database instances 114A-C, also referred to more simply as databases) and the application layer, such as application 112B, which in this example is a multitenant application at the cloud platform 110.

The service 112A may also include an interface 112E to the database layer, such as the database instance 114A and the like. The interface 112E may be implemented as an Open Data Protocol (OData) interface (e.g., HTTP message may be used to create a query to a resource identified via a URI), although the interface 112E may be implemented with other types of protocols including those in accordance with REST (Representational state transfer). In the example of FIG. 1, the database 114A may be accessed as a service at a cloud platform, which may be the same or different platform from cloud platform 110. In the case of REST compliant interfaces, the interface 112E may provide a uniform interface that decouples the client and server, is stateless (e.g., a request includes all information needed to process and respond to the request), cacheable at the client side or the server side, and the like.

The database instances 114A-C may each correspond to a runtime instance of a database management system (also referred to as a database). One or more of the database instances may be implemented as an in-memory database (in which most, if not all, the data, such as transactional data, is stored in main memory). In the example of FIG. 1, the database instances are deployed as a service, such as a DaaS, at the cloud platform 110. Although the database instances are depicted at the same cloud platform 110, one or more of the database instances may be hosted on another or separate platform (e.g., on-premise) and/or another cloud platform.

Turning now to FIG. 2, a system diagram illustrating an example of a computing system 200 for implementing a collaborative framework is shown, in accordance with one or more embodiments of the current subject matter. Referring to FIG. 2, the computing system 200 may include a plurality of client devices 202A-N, a server 250, and one or more databases 290. As shown in FIG. 2, the one or more client devices 202, the server 250, and the one or more databases 290 may be communicatively coupled via a network 260. The one or more databases 290 may include a variety of relational databases including, for example, an in-memory database, a column-based database, a row-based database, and/or the like. The database 290 may store a database object 295, with the database object 295 representative of any number and type of objects, documents, drafts, or other entities being shared and modified in real-time by client devices 202A-N.

In some example embodiments, the one or more databases 290 may include a relational database. However, it should be appreciated that the one or more databases 290 may include any type of database including, for example, an in-memory database, a hierarchical database, an object database, an object-relational database, and/or the like. For example, instead of and/or in addition to including a relational database, the one or more databases 290 may include a graph database, a column store, a key-value store, a document store, and/or the like.

The client devices 202A-N may include processor-based devices including, for example, a mobile device, a wearable apparatus, a personal computer, a workstation, an Internet-of-Things (IoT) appliance, and/or the like. The network 260 may be a wired network and/or wireless network including, for example, a public land mobile network (PLMN), a local area network (LAN), a virtual local area network (VLAN), a wide area network (WAN), the Internet, and/or the like.

In an example, the collaborative framework of computing system 200 is implemented with multiple components 220A-N and 255. Components 220A-N are client-side components which reside on client devices 202A-N, while component 255 is a backend component which resides on server 250. It is noted that server 250 may also be referred to as a "backend". The combination of components 220A-N and 255 may be collectively referred to as the "collaborative framework".

To illustrate by way of an example, a given client device 202A may open object 295 for editing by component 220A sending a notification to component 255 of server 250. In an example, the notification is sent via a first protocol (e.g., the websocket protocol). In response to receiving the notification, component 255 may notify the other client devices that the user of given client device 202A has opened object 295 for editing, with these notifications also sent via the first protocol. As the given client device 202A makes modifications to object 295, indications of the modifications may be handled similar to the above, where notifications are sent to component 255 of server 250 (via the first protocol) and then broadcast (via the first protocol) to the other client devices.

Components 220A-N may determine whether the content of the modifications are allowed to be conveyed and displayed to the respective client devices based on the access rights of the corresponding users. For example, if a given client device 202N has access rights to the fields of object 295 being modified, then the collaborative framework component 220N of the given client device 202N may retrieve the data from database 290, where the retrieval of data is performed via a second protocol (e.g., the OData protocol). After the retrieval of the modified data, the modified data may be displayed in the user interface of the given client device 202N.

It is assumed for the purposes of this discussion that the second protocol is different from the first protocol. In an example, the first protocol is a two-way protocol while the second protocol is a one-way protocol. There may be any number of type of other differences between the first and second protocols, with the number and type of differences varying from embodiment to embodiment. More details on the deployment of the collaborative framework will be described in further detail throughout the remainder of this disclosure.

Figure 3:
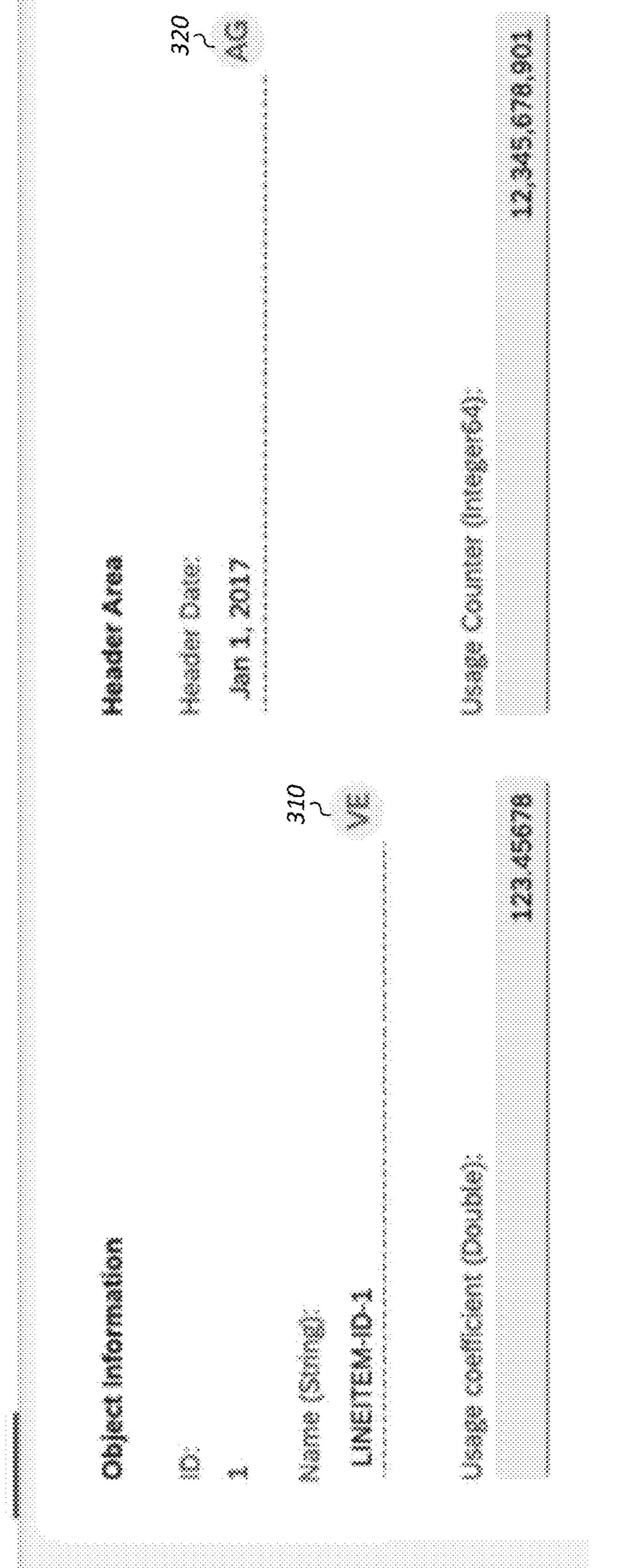
FIG. 3 illustrates an example of a user interface, in accordance with some example implementations of the current subject matter.

Referring now to FIG. 3, one example of a user interface (UI) 300 for implementing a collaborative draft is depicted, in accordance with one or more embodiments of the current subject matter. A collaborative draft allows several users to edit the same object at the same time, in a collaborative manner. For the collaborative draft UI 300 shown in FIG. 3, all users currently editing the same object can see the modifications done by other users in real-time (i.e., changes are immediately reflected in all editing clients). To avoid overwrites and editing conflicts, a property currently being edited by a user cannot be modified by other users at the same time, and the corresponding fields in UI 300 are locked, with the editing user's avatar next to them. This is illustrated in UI 300 by graphical elements 310 and 320 which are displayed to indicate that the corresponding fields of the shared object are locked by users "VE" and "AG", respectively.

The backend may be responsible for maintaining a consistent state of a draft instance when several users are editing the draft instance at the same time. This allows multiple users to access the same draft instance and modify it with PATCH and POST OData queries. In other embodiments where protocols different from the OData protocol are used, other types of queries may be employed by users to access and modify the same draft instance. When modifications are made by several users, a "last one wins" approach may be applied. For example, if two PATCH requests on the same property are sent, the second one will silently overwrite the first one.

The backend may also provide a broadcast mechanism based on, in at least one embodiment, the websockets protocol, allowing a client editing a draft to broadcast information to all other clients editing the same draft. It is noted that the backend is not managing the synchronization between the different clients. This is done by the clients themselves, using the websocket provided by the server. For example, when a modification happens on one client, this client broadcasts this information to all other clients editing the same draft, through the websocket. In an example, when receiving a notification about a change, a client reloads some data if needed, using standard OData mechanisms.

In an example, business data (e.g., amounts, properties) is not sent through the websocket. The websocket may be used only to exchange process data (e.g., to notify clients that something happened), whereas the OData service may be used to exchange business data, ensuring access rights are properly applied. It is noted that the backend provides a websocket to clients as a communication channel, but the backend is not responsible for the data that goes through the websocket, except for a few exceptions. A client sends data in the websocket to the server, and the server broadcasts the same data to all other clients editing the same draft, only adding information about the sending user. This is illustrated in the framework diagram 400 of FIG. 4 showing the connections between the backend 420 and a client application 410.

The lifecycle of a collaboration session has multiple stages. These may include an invitation stage (when an exclusive draft is turned into a collaboration draft), an initialization stage (when the user opens a draft for editing), a work stage (when the user is viewing or making changes to the draft), and an end stage (when the user leaves, deactivates, and/or discards the draft). In other embodiments, the lifecycle of a collaboration session has other numbers and/or types of stages.

In an example, in the invitation stage, each newly created draft starts out as an exclusive draft. In other words, only the creator of the draft can access the draft. To be converted into a collaboration draft, the client has to invite other users. This may be implemented by the share action defined in the appropriate settings. To decide if an application shall use a collaboration draft or not, the client checks for the existence of this share action. In an example, the share action has a parameter "Users" that can be filled with users to be invited. In an example, if this parameter is not set, the action implementation shall invite all users that have access to this object.

Figure 5:
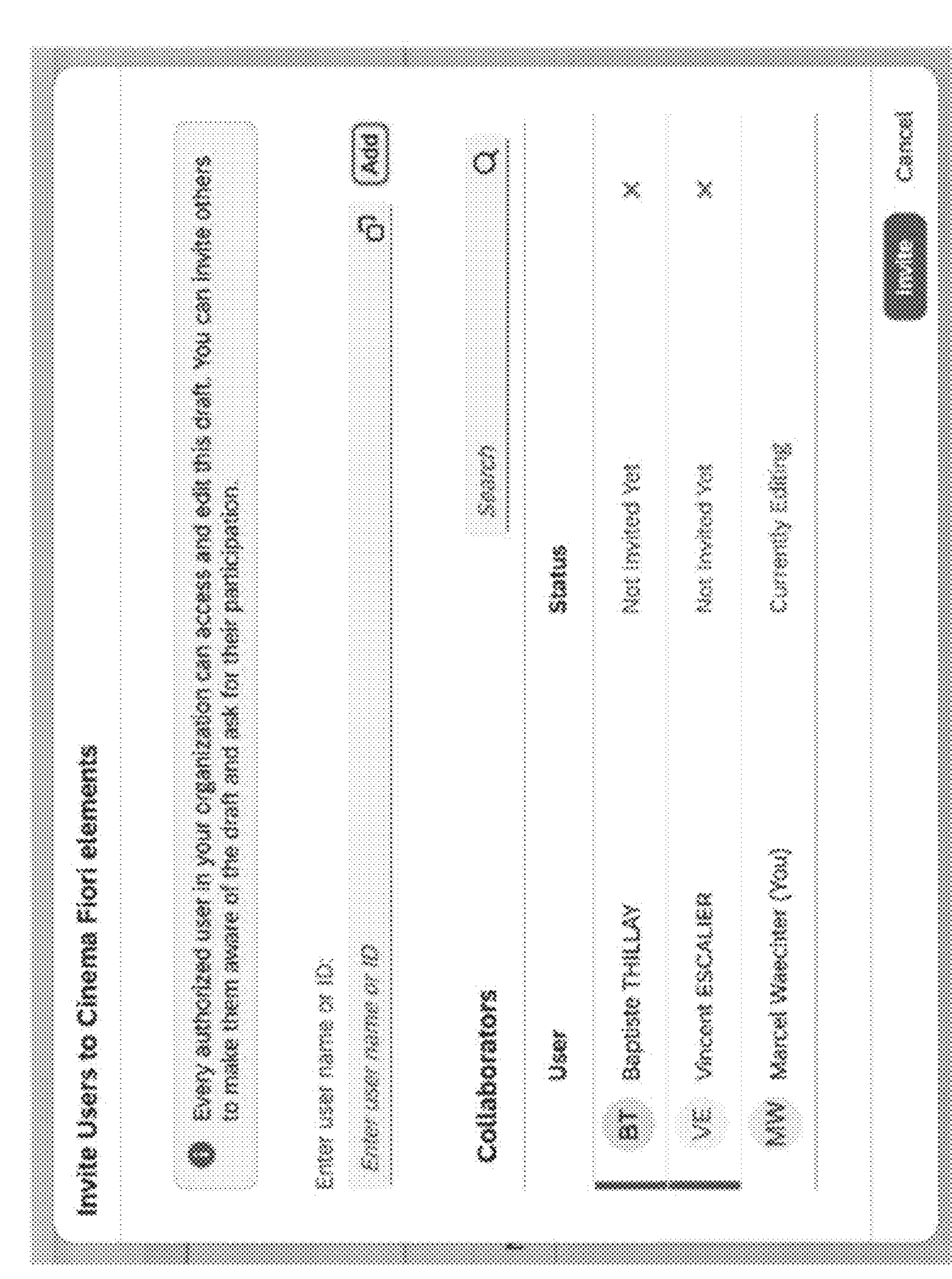
FIG. 5 illustrates an example of a user interface, in accordance with some example implementations of the current subject matter.

In an example, two different types of user experience behaviors are possible, with these different user experience behaviors being referred to as auto-mode and invite mode. In the auto-mode, every exclusive draft will be turned immediately into a collaboration draft. All users that have access to this object can access this draft. In the invite-mode, the user needs to explicitly invite other users to turn an exclusive draft into a collaboration draft. For both modes, there may be an invitation dialog UI 500 as shown in FIG. 5. The dialog UI 500 of FIG. 5 shows all users that were invited or that are performing any changes on the draft with the current editing state.

In the case of auto-mode, inviting does not mean giving authorization to the user but means making them aware of the draft. In the list report, a new filter may be introduced called "My Drafts". This "My Drafts" filter may be shown to include not only the drafts created by a user but also those to which the user was explicitly invited, and those drafts that the user was not explicitly invited to but performed any change. When a new user opens a draft, all other users editing the same draft are notified about this new user by having the user's avatar displayed at the top of the object pages. In an example, the properties currently being edited by existing users are sent back to the new user, so that the corresponding fields are immediately locked.

Turning now to FIG. 6, a sequence diagram 600 of the events associated with a user joining a collaborative draft is shown, in accordance with one or more embodiments of the current subject matter. As shown in diagram 600, whenever a user joins a draft and connects to the websocket channel, a JOIN event is sent to all connected clients via the websocket channel. When a user closes the connection, a LEAVE event is sent via the websocket channel. To ensure knowledge of the existing connected users, each existing client handles the handshake and sends a "JOINECHO" packet to ensure that the recently joined user knows which users are already connected so that the recently joined user can receive their current activities.

A user can perform several actions while editing a draft instance. The websocket is used to notify each client about the action that took place, but data refresh (if needed) is performed using a standard OData mechanism. When a new subobject is created or deleted, the identifier of the subobject is sent through the websocket, and the receiving clients reload the parent collection. In case the deleted subobject or one of the deleted subobject's children was currently displayed, back navigation is triggered to avoid displaying a deleted object.

When an OData action is performed, the name of the action is sent through the websocket, and the receiving clients trigger the side effects for this action (if any), to update the properties that have been modified by the action. When a property is modified, the identifier of the property is sent through the websocket, and the receiving clients reload this property and trigger its side effects (if any).

Figure 7:
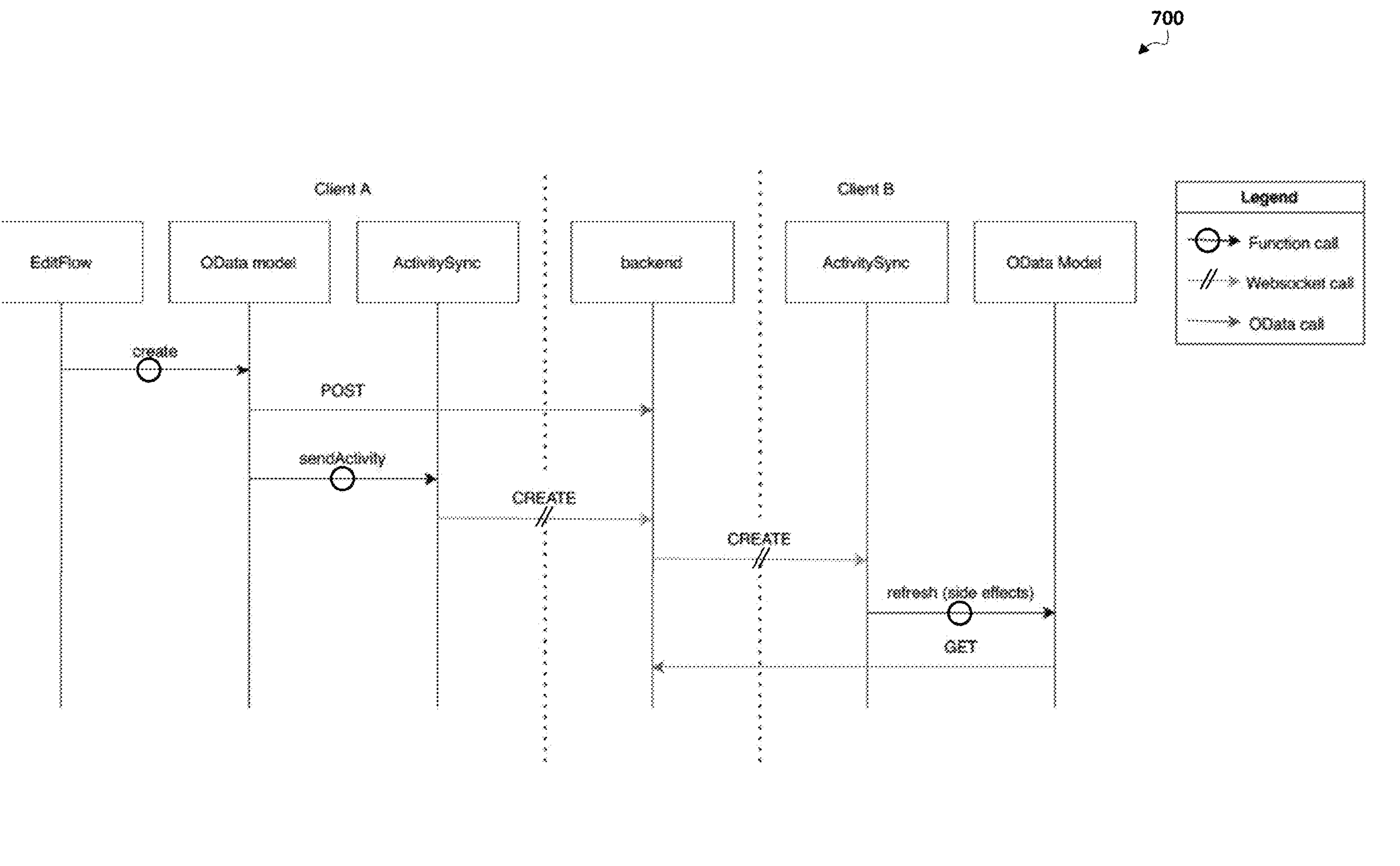
FIG. 7 illustrates a sequence diagram of the creation of a sub-object and corresponding notification, in accordance with some example implementations of the current subject matter.
Figure 8:
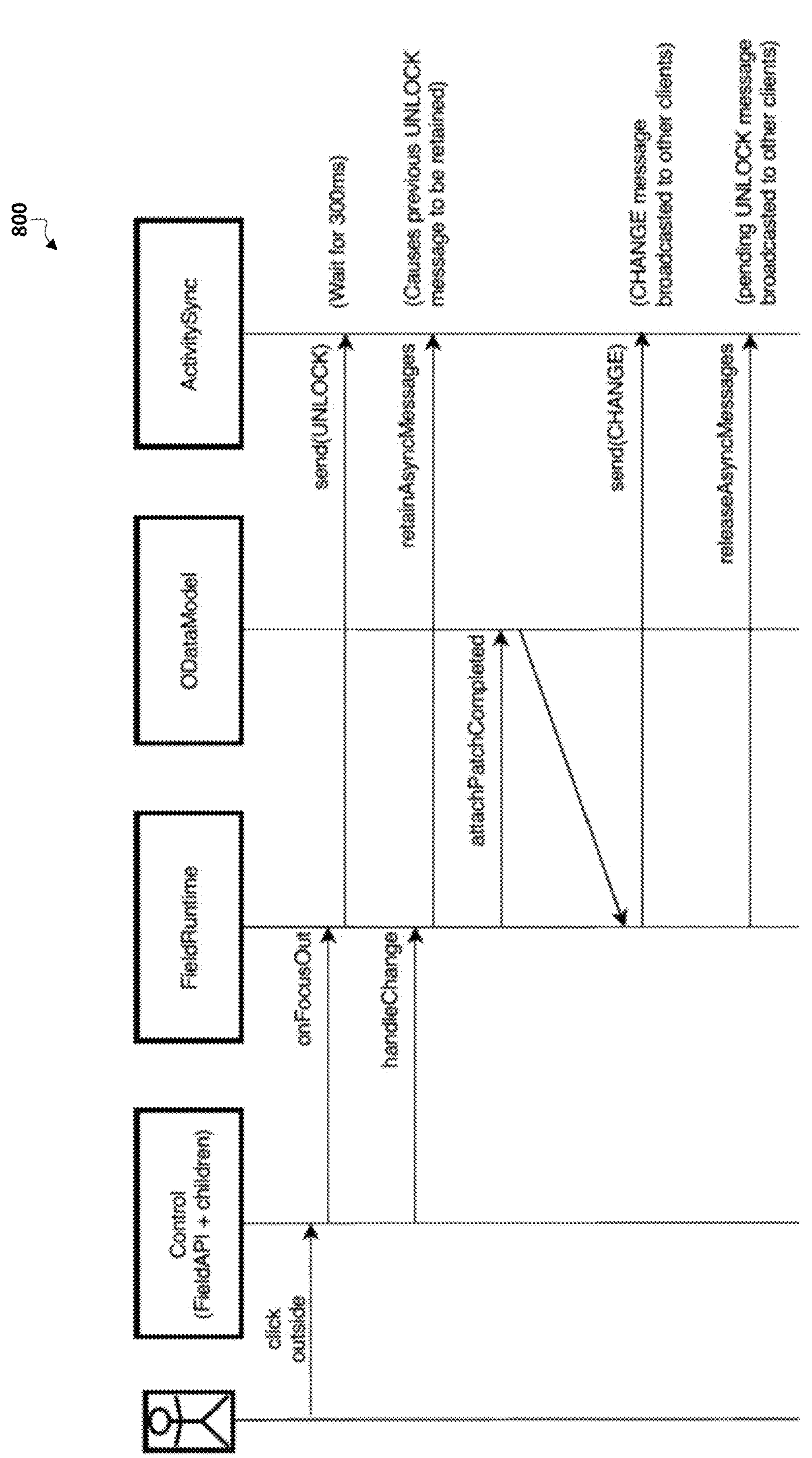
FIG. 8 illustrates a sequence diagram of the messages sent when a user modifies a value in a field and clicks outside of the field to validate the change, in accordance with some example implementations of the current subject matter.

Referring now to FIG. 7, an example of a sequence diagram 700 of the creation of a sub-object and corresponding notification is shown, in accordance with one or more embodiments of the current subject matter. Sequence diagram 700 illustrates what is happening (in an example embodiment) when a client A creates a new sub-object and a client B is notified about the creation of the new sub-object. It is noted that some intermediate classes and methods have been omitted for the sake of clarity.

For example, a "create" message is sent from the editing application to the OData model at client A when the client A creates a new sub-object. This results in a POST message being sent via the OData protocol to the backend to trigger the creation of the new sub-object in the backend. Also, a sendActivity packet is sent to an ActivitySync service at client A, and then the ActivitySync service sends a create packet over websockets to the backend. In turn, the backend sends a create packet over websockets to an ActivitySync service at client B to notify client B about the creation of the new sub-object. The client B may use the OData model to refresh any data associated with the new sub-object, and the client B may send a GET message to request the corresponding data from the backend. It should be understood that the example sequence diagram 700 of FIG. 7 is merely representative of one particular embodiment. In other embodiments, other sequences of events may be employed to create a new sub-object and generate the corresponding notifications.

Certain fields of a collaborative draft may be locked based on the types of user actions taken during editing. For example, when a user sets the focus on a field, the field may be locked for the other users after a given delay. The delay avoids quick locking and/or unlocking when the user tabs between different fields in the UI. The duration of the given delay may vary from embodiment to embodiment. In one embodiment, the given delay may be 300 milliseconds (ms). To lock the field for the other users, the identifier of the modified property is sent through the websocket. The receiving clients store this information to visually lock the field corresponding to this property. When the editing user leaves the field, the property path is sent again through the websocket so that receiving clients can unlock the field.

When a user saves or discards a draft, other users editing the same draft are notified that the draft no longer exists, and the new active version is displayed. For this mechanism, the first client activates the draft and sends the path for the active instance to other clients through the websocket. These clients then load the active instance (using an OData request) and refresh the UI accordingly.

When a user leaves a draft (e.g., by navigating away from the application or closing their browser) the websocket is closed and the backend notifies other connected clients through their websocket, so that the other clients can remove the corresponding avatar in the UI and unlock the fields that were previously locked by this user. It is noted that the user who saves the draft will be treated in the backend as the last changer and/or will be treated as responsible for all changes made in the draft. This means that other users that helped to fill out the draft will not show up in the active document.

Messages broadcast to clients through the websocket share a common structure. The messages contain the identifier (ID) and description of the user who has initiated the message, an action name, and optional parameters for the message (depending on the action). A list 900 of actions which are available are shown in FIG. 9.

The framework may distinguish between two types of messages that can be received through the websocket: the messages that lead to a data refresh from the backend, and messages that do not lead to a data refresh. Messages that do not lead to a data refresh: When received by a client, the following collaboration messages do not lead to a data refresh from the back end: JOIN, JOINECHO, LEAVE, LOCK, and UNLOCK. In such cases, the only additional load on the backend will be to broadcast the message coming from a client to all other clients editing the same draft. It is assumed that this has no significant impact on the backend performance, at least with a reasonable number of clients editing the same draft (e.g., less than 100, most likely about 10).

Messages that lead to a data refresh: When receiving a CHANGE message (i.e., when a property value is changed by another client), the receiving client refreshes the value for this property (one GET query), and also refreshes the target properties and entities in the side effects for which this property is a source (one GET query per target entity set and per side effect annotation). If the side effect annotation contains a triggered action, this action is not executed. All these GET queries are grouped in the same batch request.

Similarly, when receiving a DELETE or CREATE message, the receiving client refreshes the entity set where the creation or deletion happened and triggers the corresponding side effects (without triggered action if any) in a single batch request. When receiving an ACTION message (another client has executed an OData action), the receiving client refreshes the target properties and entities listed in the side effects annotations for the action (one GET query per target entity set, per side effect annotation and per element on which the action has been executed). In some cases, the receiving client may also reload some properties on the bound entity set (one GET query per element on which the action has been executed). All these GET queries are executed in a single batch request.

When receiving a SAVE or DISCARD action (another client has saved or discarded the draft), the receiving client will navigate to the main object page (corresponding to the root entity) and will display the action version of the object. This will trigger several GET queries in potentially several batch requests, but this is the same as when the object page is displayed in "normal" situations.

When N users are editing the same draft concurrently, an action from 1 user will lead to the following load in the backend: N−1 messages broadcast through the websocket; N−1 batch requests (with several GETs) if the message corresponds to modifications (property change, sub-item created or deleted, OData action execution); (N−1)*P batch requests if the message corresponding to draft save or discard, where P is the number of batch requests that occur when a user opens the object page in read-only mode.

The described subject matter has the following limitations. The communication between the clients is not managed centrally, as each client broadcasts messages based on its own activity, and receives messages from other clients asynchronously. As a result, there are cases where two users could perform "incompatible" activities in parallel. For example, user A could save a draft while user B modifies a property on the same draft. Depending on which order the messages are broadcasted and received, the changes from user B could be saved, ignored, or could lead to an error.

There are possible edge cases, and showing an error when needed is acceptable behavior. However, there may be one scenario that requests special handling. If two users modify two properties at the same time, one of the users may send a PATCH request with their changes on an outdated instance, raising an exception due to ETag mismatch. To solve this issue, ETag handling may be disabled for such requests.

Figure 10:
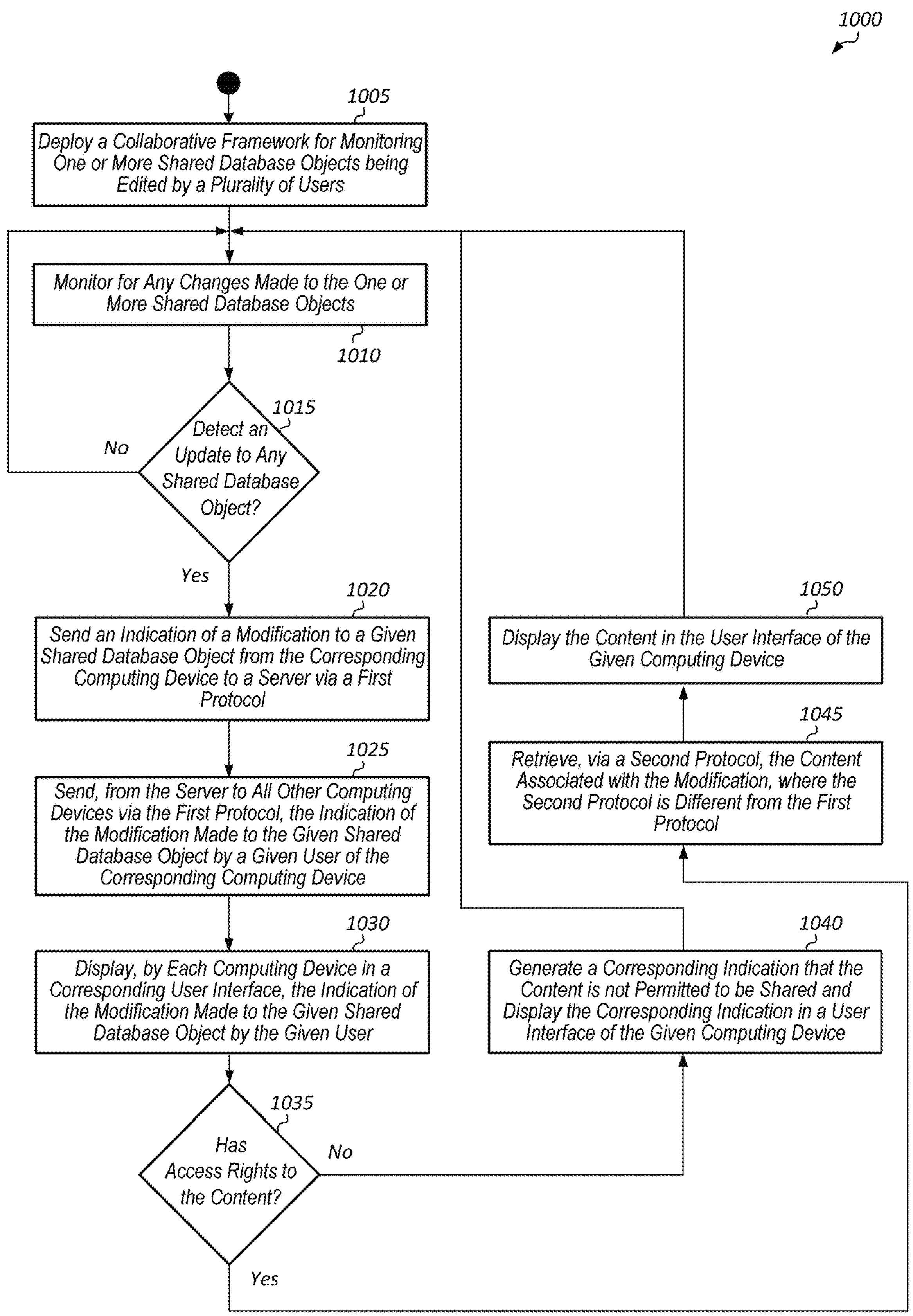
FIG. 10 illustrates an example of a process for implementing a collaborative editing framework, in accordance with some example implementations of the current subject matter.

Turning now to FIG. 10, a process for implementing a collaborative editing framework is depicted, in accordance with one or more embodiments of the current subject matter. A collaborative framework for monitoring one or more shared database objects being edited by a plurality of users is deployed (block 1005). As part of the deployment of the collaborative framework, software executing on a plurality of computing devices corresponding to the plurality of users monitors for any changes made to the one or more shared database objects (block 1010). If an update to any of the shared database objects is detected (conditional block 1015, "yes" leg), then an indication of a modification to a given shared database object is sent from the corresponding computing device to a server via a first protocol (block 1020). If no updates are detected to any of the shared database objects (conditional block 1015, "no" leg), then method 1000 returns to block 1010.

After block 1020, the server sends (i.e., broadcasts), to all other computing devices via the first protocol, the indication of the modification made to the given shared database object by a given user of the corresponding computing device (block 1025). Then, each of the other computing devices (which are part of the collaborative framework) displays, in a corresponding user interface of the respective computing device, the indication of the modification made to the given shared database object by the given user (block 1030). For an example, an avatar representing the given user may be shown next to an icon associated with the given shared database object. Next, an application executing on each of the other computing devices determines whether a user on the respective computing device has access rights permitting the content of the modification made to the given shared database object by the given user to be shared with the user on the respective computing device (conditional block 1035). It is noted that conditional block 1035 may be performed separately for each computing device that is part of the collaborative framework.

If, for a given computing device, the access rights permit the content corresponding to the modification to be shared (conditional block 1035, "yes" leg), then the given computing device retrieves, via a second protocol, the content associated with the modification (block 1045). It is assumed for the purposes of this discussion that the second protocol is different from the first protocol. In an example, the first protocol is a two-way protocol while the second protocol is a one-way protocol. Alternatively or additionally, the first protocol may be the websocket protocol and the second protocol may be the OData protocol. After receiving the content associated with the modification, the content is displayed in a user interface of the given computing device (block 1050).

If, for the given computing device, the access rights do not permit the content corresponding to the modification to be shared (conditional block 1035, "no" leg), then a corresponding indication that the content is not permitted to be shared is generated and displayed in the user interface of the given computing device (block 1040). After blocks 1040 and 1050, method 1000 may return to block 1010.

Figure 11A:
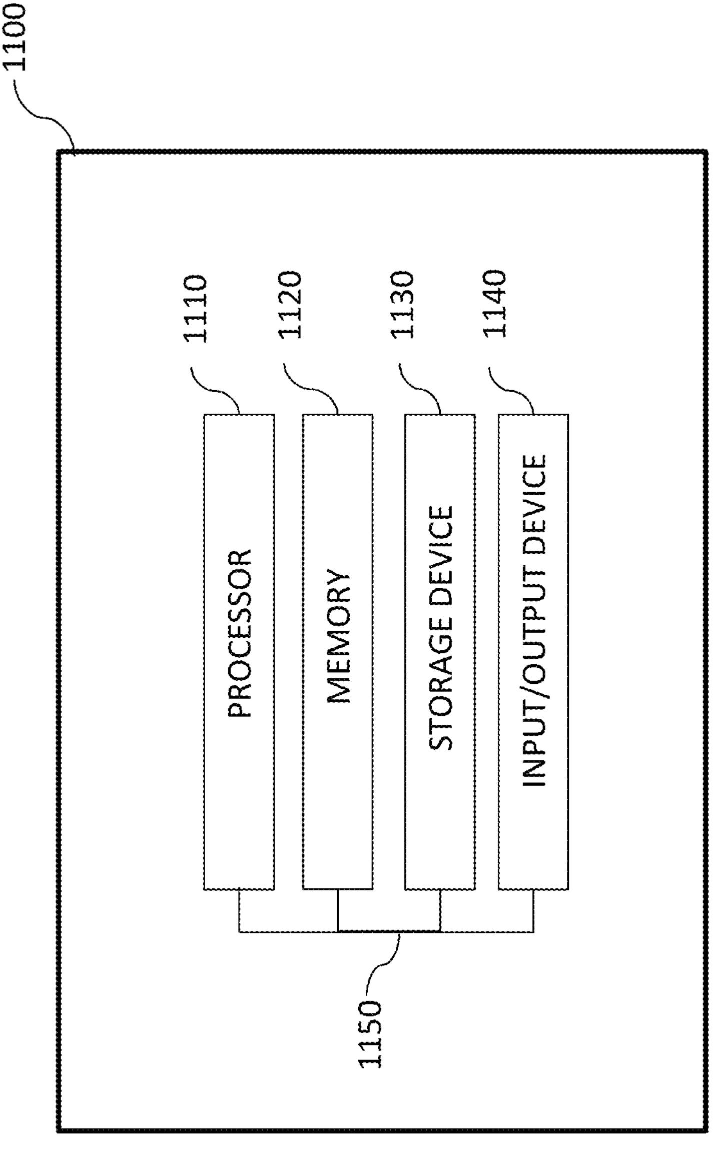
FIG. 11A depicts an example of a system, in accordance with some example implementations of the current subject matter.

In some implementations, the current subject matter may be configured to be implemented in a system 1100, as shown in FIG. 11A. The system 1100 may include a processor 1110, a memory 1120, a storage device 1130, and an input/output device 1140. Each of the components 1110, 1120, 1130 and 1140 may be interconnected using a system bus 1150. The processor 1110 may be configured to process instructions for execution within the system 1100. In some implementations, the processor 1110 may be a single-threaded processor. In alternate implementations, the processor 1110 may be a multi-threaded processor. The processor 1110 may be further configured to process instructions stored in the memory

1120 or on the storage device 1130, including receiving or sending information through the input/output device 1140. The memory 1120 may store information within the system 1100. In some implementations, the memory 1120 may be a computer-readable medium. In alternate implementations, the memory 1120 may be a volatile memory unit. In yet some implementations, the memory 1120 may be a non-volatile memory unit. The storage device 1130 may be capable of providing mass storage for the system 1100. In some implementations, the storage device 1130 may be a computer-readable medium. In alternate implementations, the storage device 1130 may be a floppy disk device, a hard disk device, an optical disk device, a tape device, non-volatile solid state memory, or any other type of storage device. The input/output device 1140 may be configured to provide input/output operations for the system 1100. In some implementations, the input/output device 1140 may include a keyboard and/or pointing device. In alternate implementations, the input/output device 1140 may include a display unit for displaying graphical user interfaces.

Figure 11B:
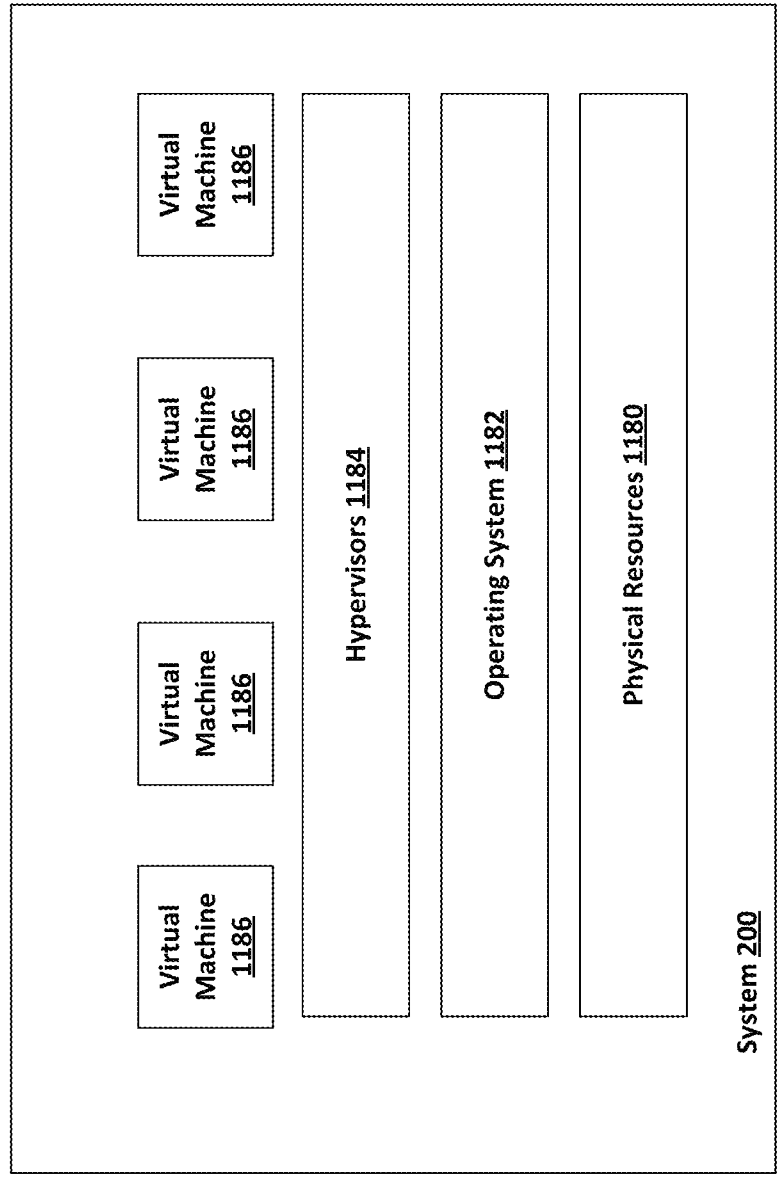
FIG. 11B depicts another example of a system, in accordance with some example implementations of the current subject matter.

FIG. 11B depicts an example implementation of the system 200 (of FIG. 2). The system 200 may be implemented using various physical resources 1180, such as at least one or more hardware servers, at least one storage, at least one memory, at least one network interface, and the like. The system 200 may also be implemented using infrastructure, as noted above, which may include at least one operating system 1182 for the physical resources 1180 and at least one hypervisor 1184 (which may create and run at least one virtual machine 1186). For example, each multitenant application may be run on a corresponding virtual machine 1186.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable storage medium" refers to any computer program product, apparatus and/or device, such as for example magnetic discs, optical disks, memory, and Programmable Logic Devices (PLDs), used to provide machine instructions and/or data to a programmable processor, including a machine-readable storage medium that receives program instructions as a machine-readable signal. The term "machine-readable signal" refers to any signal used to provide machine instructions and/or data to a programmable processor. The machine-readable storage medium can store such program instructions non-transitorily, such as for example as would a non-transient solid state memory or a magnetic hard drive or any equivalent storage medium. The machine-readable storage medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C," "one or more of A, B, and C," and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; and at least one memory storing instructions that, when executed by the at least one processor, cause operations comprising: receiving, by a first computing device via a first protocol, an indication of a modification made to a first database object on a second computing device; displaying, in a user interface on the first computing device of a first user, the indication of the modification made to the first database object; retrieving, from the second computing device by the first computing device via a second protocol, content associated with the modification responsive to determining that access rights of the first user permit the content to be displayed to the first user, wherein the second protocol is different from the first protocol; and displaying, in the user interface on the first computing device, the content associated with the modification made to the first database object Example 2: The system of Example 1, wherein responsive to determining that the access rights of the first user do not permit the content to be displayed to the first user, the operations further comprise displaying, in the user interface on the first computing device, a second indication that the content is not allowed to be displayed.

Example 3: The system of any of Examples 1-2, wherein the first protocol is a two-way protocol, and wherein the second protocol is a one-way protocol.

Example 4: The system of any of Examples 1-3, wherein the operations further comprise sending the indication of the modification to one or more other computing devices corresponding to one or more other users who are also editing the first database object.

Example 5: The system of any of Examples 1-4, wherein the first protocol is used to exchange a first type of data.

Example 6: The system of any of Examples 1-5, wherein the second protocol is used to exchange a second type of data while ensuring access rights are properly applied, wherein the second type of data is different from the first type of data.

Example 7: The system of any of Examples 1-6, wherein the first type of data is process data.

Example 8: The system of any of Examples 1-7, wherein the second type of data is business data.

Example 9: The system of any of Examples 1-8, wherein a message sent via the first protocol comprises an identifier and description of a user who initiated the message.

Example 10: The system of any of Examples 1-9, wherein the message sent via the first protocol comprises an action name corresponding to an action which triggered the message.

Example 11: A computer-implemented method comprising: receiving, by a first computing device via a first protocol, an indication of a modification made to a first database object on a second computing device; displaying, in a user interface on the first computing device of a first user, the indication of the modification made to the first database object; retrieving, from the second computing device by the first computing device via a second protocol, content associated with the modification responsive to determining that access rights of the first user permit the content to be displayed to the first user, wherein the second protocol is different from the first protocol; and displaying, in the user interface on the first computing device, the content associated with the modification made to the first database object.

Example 12: The method of Example 11, wherein responsive to determining that the access rights of the first user do not permit the content to be displayed to the first user, the method further comprising displaying, in the user interface on the first computing device, a second indication that the content is not allowed to be displayed.

Example 13: The method of any of Examples 11-12, wherein the first protocol is a two-way protocol, and wherein the second protocol is a one-way protocol.

Example 14: The method of any of Examples 11-13, further comprising sending the indication of the modification to one or more other computing devices corresponding to one or more other users who are also editing the first database object.

Example 15: The method of any of Examples 11-14, wherein the first protocol is used to exchange a first type of data.

Example 16: The method of any of Examples 11-15, wherein the second protocol is used to exchange a second type of data while ensuring access rights are properly applied, wherein the second type of data is different from the first type of data.

Example 17: The method of any of Examples 11-16, wherein the first type of data is process data, and wherein the second type of data is business data.

Example 18: The method of any of Examples 11-17, wherein a message sent via the first protocol comprises an identifier and description of a user who initiated the message.

Example 19: The method of any of Examples 11-18, wherein the message sent via the first protocol comprises an action name corresponding to an action which triggered the message.

Example 20: A non-transitory computer readable storage medium storing instructions, which when executed by at least one data processor, result in operations comprising: receiving, by a first computing device via a first protocol, an indication of a modification made to a first database object on a second computing device; displaying, in a user interface on the first computing device of a first user, the indication of the modification made to the first database object; retrieving, from the second computing device by the first computing device via a second protocol, content associated with the modification responsive to determining that access rights of the first user permit the content to be displayed to the first user, wherein the second protocol is different from the first protocol; and displaying, in the user interface on the first computing device, the content associated with the modification made to the first database object.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system comprising:

at least one processor; and at least one memory storing instructions that, when executed by the at least one processor, cause operations comprising:

receiving, by a first computing device via a first protocol, an indication of a modification made to a first database object on a second computing device, wherein the first protocol is a two-way protocol for exchanging process data;

displaying, in a user interface on the first computing device of a first user, the indication of the modification made to the first database object;

retrieving, from the second computing device by the first computing device via a second protocol, content associated with the modification responsive to determining that access rights of the first user permit the content to be displayed to the first user, wherein the second protocol is a one-way protocol for exchanging business data while ensuring the access rights are properly applied and is different from the first protocol; and displaying, in the user interface on the first computing device, the content associated with the modification made to the first database object.

2. The system of claim 1, wherein responsive to determining that the access rights of the first user do not permit the content to be displayed to the first user, the operations further comprise displaying, in the user interface on the first computing device, a second indication that the content is not allowed to be displayed.

3. The system of claim 1, wherein the first protocol is a websocket protocol, and wherein the second protocol is an OData protocol.

4. The system of claim 1, wherein the operations further comprise sending the indication of the modification to one or more other computing devices corresponding to one or more other users who are also editing the first database object.

5. The system of claim 1, wherein a message sent via the first protocol comprises an identifier and description of a user who initiated the message.

6. The system of claim 5, wherein the message sent via the first protocol comprises an action name corresponding to an action which triggered the message.

7. A computer-implemented method comprising:

receiving, by a first computing device via a first protocol, an indication of a modification made to a first database object on a second computing device, wherein the first protocol is a two-way protocol for exchanging process data;

displaying, in a user interface on the first computing device of a first user, the indication of the modification made to the first database object;

retrieving, from the second computing device by the first computing device via a second protocol, content associated with the modification responsive to determining that access rights of the first user permit the content to be displayed to the first user, wherein the second protocol is a one-way protocol for exchanging business data while ensuring the access rights are properly applied and is different from the first protocol; and displaying, in the user interface on the first computing device, the content associated with the modification made to the first database object.

8. The computer-implemented method of claim 7, wherein responsive to determining that the access rights of the first user do not permit the content to be displayed to the first user, the method further comprising displaying, in the user interface on the first computing device, a second indication that the content is not allowed to be displayed.

9. The computer-implemented method of claim 7, wherein the first protocol is a websocket protocol, and wherein the second protocol is an OData protocol.

10. The computer-implemented method of claim 7, further comprising sending the indication of the modification to one or more other computing devices corresponding to one or more other users who are also editing the first database object.

11. The computer-implemented method of claim 7, wherein a message sent via the first protocol comprises an identifier and description of a user who initiated the message.

12. The computer-implemented method of claim 11, wherein the message sent via the first protocol comprises an action name corresponding to an action which triggered the message.

13. A non-transitory computer readable storage medium storing instructions, which when executed by at least one data processor, result in operations comprising:

receiving, by a first computing device via a first protocol, an indication of a modification made to a first database object on a second computing device, wherein the first protocol is a two-way protocol for exchanging process data;

displaying, in a user interface on the first computing device of a first user, the indication of the modification made to the first database object;

retrieving, from the second computing device by the first computing device via a second protocol, content associated with the modification responsive to determining that access rights of the first user permit the content to be displayed to the first user, wherein the second protocol is a one-way protocol for exchanging business data while ensuring the access rights are properly applied and is different from the first protocol; and displaying, in the user interface on the first computing device, the content associated with the modification made to the first database object.

* * * * *